May 4, 1926. R. V. BINGAY 1,583,384
TRANSFORMER TANK
Filed Jan. 9, 1922
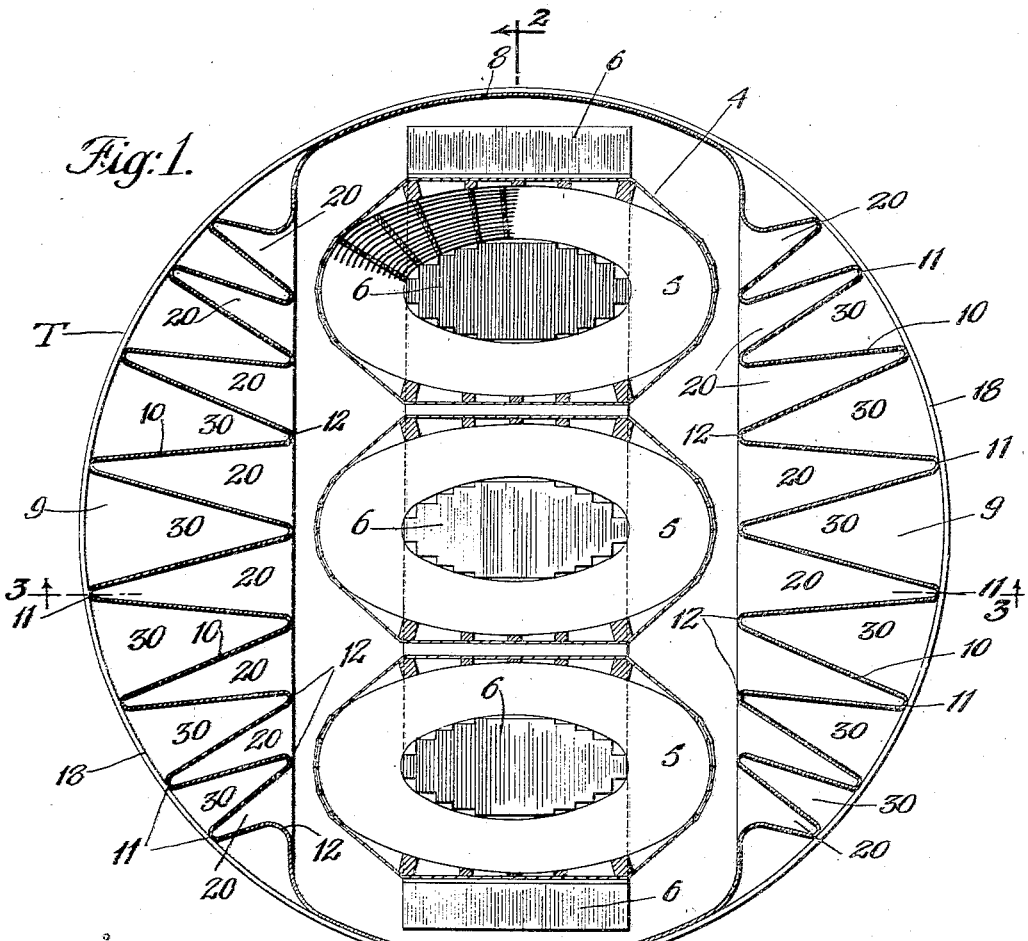
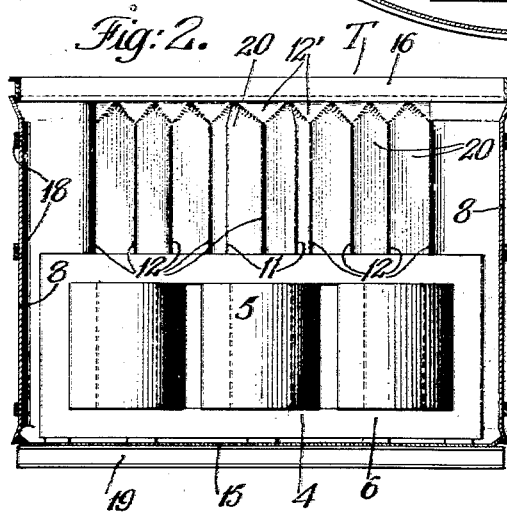
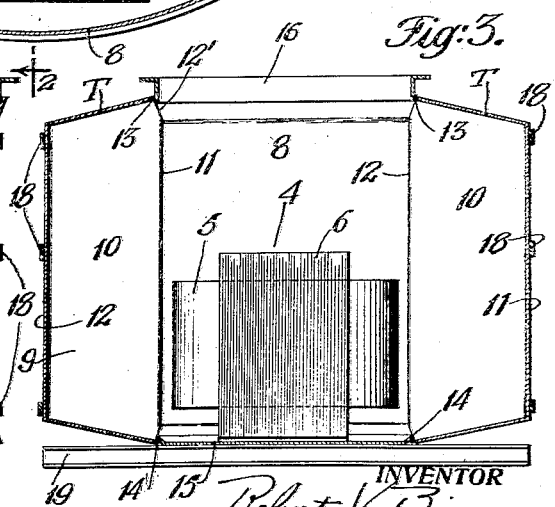
INVENTOR
Robert V. Bingay
BY
Edwards Sager & Bower
ATTORNEYS Patented May 4, 1926.

1,583,384

UNITED STATES PATENT OFFICE.

ROBERT V. BINGAY, OF PITTSBURGH, PENNSYLVANIA, ASSIGNOR TO PITTSBURGH TRANSFORMER COMPANY, A CORPORATION OF PENNSYLVANIA.

TRANSFORMER TANK.

Application filed January 9, 1922. Serial No. 527,865.

*To all whom it may concern:*

Be it known that I, ROBERT V. BINGAY, a citizen of the United States, residing at Pittsburgh, in the county of Allegheny and State of Pennsylvania, have invented certain new and useful Improvements in Transformer Tanks, of which the following is a specification.

This invention relates to tanks adapted to contain and cool a liquid, and particularly to a tank for a transformer submerged in oil which circulates along the wall of the tank and is cooled thereby.

The object of the invention is to provide a tank adapted to contain a long transformer within relatively small over all dimensions and at the same time having increased mechanical strength and efficiency in cooling.

In the accompanying drawings illustrating the invention—

Fig. 1 is a horizontal sectional view of a tank with a transformer indicated in position in it, and Figs. 2 and 3 are vertical sectional views on lines 2—2 and 3—3 respectively of Fig. 1.

In the specific embodiment of the invention illustrated in the drawings the transformer is shown at 4 having three coils 5 and a core 6 with five legs so that it is long relatively to its width. If the usual practice were followed in providing a tank for this type of transformer the shape of the tank would follow generally the outline of the transformer and be relatively long and narrow with corrugated sides and corrugated ends extending outward from the ends of the transformer. Such a tank is considerably longer than the transformer and is clumsy and difficult to fit into some installations. The long sides of such a transformer are also relatively weak with tendency to bend or bulge under the weight of the contained oil so that extensive reinforcement is required.

The tank T of this invention instead of being elongated is of generally circular form with its end portions 8 close to the adjacent ends of the transformer and made of flat uncorrugated sheet metal, so that the over all diameter of the tank only slightly exceeds the length of the transformer. The portions 9 of the tank in each side of the core have corrugations 10 progressively increasing in depth toward the center so that their outer bends 11 are in the arc of the circular circumference and their inner bends 12 are in surfaces extending along the sides of the transformer close to the ends of the coils 5. The body of the tank is built up of sheet metal cut up and bent and welded together. The upper and lower ends of the corrugations are closed by being bent in arched form and welded together and the upper and lower ends of the inner bends 12 are flattened outward as indicated at 12' so that their inner edges meet along continuous ridges 13, 14 to which are welded the top and bottom members of the tank. The bottom 15 of the tank is a flat plate rounded at the ends and with its edges turned upward and fitted and welded within the lower ridge 14. The top of the tank comprises a cover (not shown) adapted to be clamped to the angle bar frame 16 formed of angle bars bent generally to oval form and fitted and welded as shown within the upper ridge 13. Circular bands 18 may be provided around the outer bends 11 of the corrugations and welded thereto and the tank mounted on a base 19.

The tank of this invention provides large vertical channels 20 for the circulation of the cooling oil and these channels are unobstructed and radiate outward from close proximity with the transformer surfaces. Similar large vertical channels 30 are provided for the air circulation, and a maximum of effective cooling area is attained within the minimum over all dimension which is the diameter of the tank. The cooling effect is also most efficiently distributed to increase toward the central portions of the transformer thus giving the greatest cooling to the portions needing it most. The circular form of the outside of the tank provides great strength and with the resultant symmetrically arched form is continuous all around and without any intermediate flat sides to bulge or bend in service. The arched ends of the corrugations extend from the ridges 13, 14 to the outer bends 11 of the corrugations so that the whole structure is rigidly bound together in a single self-supporting unit.

I claim:

1. The combination with a transformer having substantially straight sides, of a tank comprising a wall having corrugations therein, said corrugations gradually increasing in depth as the central portion of said sides is approached from the ends of said sides.

2. The combination with a transformer having substantially straight sides, of a tank comprising a wall having corrugations therein, said corrugations gradually increasing in depth as the central portion of said sides is approached from the ends of said sides, said corrugations on their inner sides being disposed in a line which conforms generally to the conformation of the transformer sides, while the outer portions of said corrugations are disposed in a line differing from the inner line whereby the outer surface of said tank is different in shape than that of said transformer.

3. In an apparatus comprising a tank and a transformer therein having greater length than width, which transformer forms a heater in said tank, the combination with such heater, of the tank therefor, such tank having a generally circular periphery with uncorrugated portions adjacent the ends of the heater and corrugations along the sides of the heater.

4. A tank for a transformer having a generally circular periphery with uncorrugated portions adjacent the narrower portion of said transformer and corrugations along the longer portion of said transformer progressively increasing in size toward the center of said longer portion.

5. The combination with a polyphase transformer having substantially parallel transformer units, of a tank of generally circular outline having means providing a cooling area relatively increasing from the ends of the transformer toward a point intermediate said ends so as to relatively increase the cooling effect at said center portion.

6. The combination with a transformer having greater length than width, of a tank therefor having a generally circular periphery with corrugations along the sides of said transformer progressively increasing in size toward the center of said sides and extending on generally radial lines.

7. The combination with a transformer having greater length than width, of a tank therefor having arched uncorrugated ends closely adjacent the ends of said transformer and arched corrugated sides extending between said ends.

8. The combination of a transformer having greater length than width, of a tank therefor having corrugations along the sides of the transformer progressively increasing in size toward the center of the sides, the lower end of the outer bend of each corrugation being closed along an inwardly and downwardly inclined line.

9. The combination with a transformer having greater length than width, of a tank therefor having corrugations along the sides of the transformer progressively increasing in size toward the center of the sides, the upper end of the inner bend of the corrugations being flattened to form a substantially straight edge and a cover supporting member welded to said edge.

10. The combination of a tranformer having greater length than width of a tank therefor having a generally circular periphery with corrugations along the sides of the transformer progressively increasing in size toward the center of the sides and bands encircling said tank and secured to the outer bends of said corrugations.

ROBERT V. BINGAY.